United States Patent
Jin-woo et al.

(10) Patent No.: US 7,009,360 B2
(45) Date of Patent: Mar. 7, 2006

(54) METHOD FOR CONTROLLING SRM SWITCHING ANGLE BY ANALOG ENCODER SYSTEM

(76) Inventors: Ahn Jin-woo, Department of Computer Engineering, Kyungsung University, 110, Daeyeon-dong, Nam-gu, Busan (KR); Park Seong-joon, 102-608, Saehan Apts., Yeonje-dong, Buk-gu, Gwangju (KR)

( * ) Notice: Subject to any disclaimer, the term of this patent is extended or adjusted under 35 U.S.C. 154(b) by 0 days.

(21) Appl. No.: 11/008,741

(22) Filed: Dec. 9, 2004

(65) Prior Publication Data

US 2005/0127864 A1    Jun. 16, 2005

(30) Foreign Application Priority Data

Dec. 10, 2003    (KR) .................. 10-2003-0089438

(51) Int. Cl.
H02P 7/00        (2006.01)

(52) U.S. Cl. .................. 318/701; 318/254; 318/138; 318/439; 73/1.41; 73/1.37; 702/150; 702/151; 702/163; 324/200; 324/207.11; 324/207.21; 324/207.25

(58) Field of Classification Search .......... 318/701, 318/254, 138, 439; 73/1.41, 1.37; 702/150, 702/151, 163; 324/200, 207.11, 207.21, 324/207.25

See application file for complete search history.

(56) References Cited

U.S. PATENT DOCUMENTS

| 4,870,559 | A | * | 9/1989 | Hyatt ........................ 700/1 |
| 6,087,948 | A | * | 7/2000 | Oveby et al. ............... 340/635 |
| 6,212,230 | B1 | * | 4/2001 | Rybicki et al. ............. 375/239 |
| 6,281,828 | B1 | * | 8/2001 | Kimura et al. ............. 341/155 |
| 6,492,911 | B1 | * | 12/2002 | Netzer ................... 340/870.37 |
| 6,509,710 | B1 | * | 1/2003 | Grasso et al. .............. 318/701 |
| 6,564,168 | B1 | * | 5/2003 | Hasser ...................... 702/163 |
| 6,586,897 | B1 | | 7/2003 | Kim et al. |
| 6,668,666 | B1 | * | 12/2003 | Chen et al. ............. 73/862.381 |

FOREIGN PATENT DOCUMENTS

| WO | WO 01/73939 | 10/2001 |
| WO | WO 03/100948 | 12/2003 |

* cited by examiner

Primary Examiner—Rita Leykin

(74) Attorney, Agent, or Firm—John W. Renner; Renner, Otto, Boisselle & Sklar

(57) ABSTRACT

Disclosed is a method for controlling an SRM (Switched Reluctance Motor) switching angle by an analog encoder system that can perform a precise control of the switching angle of the SRM by comparing an analog sensor signal detected by the analog encoder system with a switching-on/off command signal. During a rotation of an encoder rotor having rotary slits formed at the same intervals on the encoder rotor and continuous contrast patterns formed between the respective rotary slits, analog sensor signals $\theta_a$ to $\theta_d$ detected in proportion to the contrast patterns are compared with a switching-on/off command signal controlled by a digital-to-analog (D/A) converter. A switching-on angle $\theta_{on}$ is set to a crossing point of the switching-on command signal $V_{on}$ and a slope between the sensor signals $\theta_a$ and $\theta_o$, and a switching-off angle $\theta_{off}$ is set to a crossing point of the switching-off command signal $V_{off}$ and a slope between the sensor signals $\theta_o$ and $\theta_d$.

1 Claim, 9 Drawing Sheets

METHOD FOR CONTROLLING SRM SWITCHING ANGLE BY ANALOG ENCODER SYSTEM

BACKGROUND OF THE INVENTION

1. Field of the Invention

The present invention relates to a method for controlling an SRM (Switched Reluctance Motor) switching angle by an analog encoder system that can perform a precise control of the switching angle of the SRM by comparing an analog sensor signal detected by the analog encoder system with a switching-on/off command signal.

2. Description of the Prior Art

With the rapid technical development of power semiconductor devices, they now have a high switching speed and a large capacity. Also, with the spread of mechatronics in industry, the development of multi-function and high-performance motors has been actively made.

An SRM is a kind of single excited machine that has a simple structure and is low-priced. The SRM is stable against any short-through fault through its phase separation, and has the speed-torque characteristic of a DC motor. Additionally, the SRM has a wide speed variation range, superior high-speed and forward/reverse rotation characteristics, and a strong structure. The researches and developments for expanding the application fields of SRM into the fields of home appliances, electric vehicles, airplanes and the whole industry have now been in progress around advanced countries.

In the SRM, a rotor is forced in a direction that the magneto resistance of an excited magnetic circuit is minimized in order to produce a resultant rotating force. This corresponds to the physical phenomenon whereby the energy of a system is minimized through the change of the energy stored in the system to a mechanical energy. Devices using this physical principle include a pulling magnet as a simple actuator, a linear solenoid, a relay, a step switch, etc.

FIG. 1 is a view illustrating a conventional SRM driving system. The SRM is a kind of motor that uses reluctance torque. In order to use the reluctance torque at maximum, both a stator 10 and a rotor 20 of the SRM have a salient pole type structure, and wire is wound only on the stator 10 as a concentrated wire. In this case, the torque is generated in a direction that the reluctance of the magnetic circuit becomes minimized, and the magnitude of the torque generated accordingly is in proportion to the square of a current i flowing through an upper winding and the change rate of an inductance L to a position angle θ of the rotor 20 as shown in Equation (1.).

$$T = \frac{1}{2} i^2 \frac{\partial L(\theta, i)}{\partial \theta} \qquad (1)$$

Accordingly, the torque generation section should be utilized at maximum by maximize the change rate of the inductance and promptly establishing the current corresponding to a load at the on/off time point of respective upper switches.

That is, the control of the SRM is affected by the input voltage and the switching-on/off angle, and in order for a voltage source to effectively raise the current, it is required to perform a switching operation before the salient poles of the stator and the rotor meet together. The switching-on angle is an important factor for properly raising the current.

Accordingly, in order to obtain the optimum SRM operation characteristic, it is necessary to control the switching-on/off angle accurately.

As described above, the upper winding of the stator 10 of the SRM requires information about the position angle of the rotor 20 in view of the characteristic that it should be excited in synchronization with the position of the rotor 20. Although the detection of the position angle of the rotor 20 is generally performed using an encoder or a resolver, such a mechanical external position sensor has the problems in that as its resolution is higher, its manufacturing cost becomes higher. Accordingly, in order to reduce the burden of the installation cost, a low-priced encoder has conventionally been used. Additionally, in order to completely remove the encoder installation cost, researches for a sensorless SRM switching angle control method have actively been in progress.

In consideration of the cost, it is general to use a low-priced encoder, and especially an incremental encoder. The incremental encoder operates in a manner that the number of output pulses according to the position of the rotor is counted and converted into a digital value by an up/down counter, and a microprocessor controls signals of respective phases according to the digital counted values.

Generally, a digital code type encoder system having a microprocessor is widely used in motor control due to its characteristics of high performance, easy data process, programming flexibility, etc. In the case of the incremental encoder, the accuracy of the position and speed of the rotor depends upon the sampling period and the resolution of the encoder, and thus the control performance of the SRM is determined by the accuracy of the rotor position and the performance of the microprocessor.

The absolute measurement error is determined by an error ($\Delta\theta_e$) according to the resolution of the encoder (expressed by Equation (2)) and an error ($\Delta\theta_p$) according to the rotor speed during a sampling period (expressed by Equation (3)).

$$\Delta\theta_e = 2\pi \frac{N_r}{N_p} \qquad (2)$$

$$\Delta\theta_p = \omega_r \cdot T_s \qquad (3)$$

Here, $N_r$ denotes the number of rotor poles, $N_p$ the resolution of the encoder, $T_s$ the sampling period of the microprocessor, and $\omega_r$ the rotating speed, respectively. Accordingly, the absolute measurement error is expressed by Equation (4).

$$\Delta\theta_s = \Delta\theta_e + \Delta\theta_p = 2\pi \frac{N_r}{N_p} + \omega_r \cdot T_s \qquad (4)$$

FIG. 2 is a graph illustrating the absolute measurement error according to the speed in the microprocessor of the incremental encoder system. It can be seen that in a low-speed region, the deviation of the motor position in the sampling period is increased as the motor speed is increased. Generally, if the motor speed is 3000 [rpm] and the sampling period is 200 [μs] in a state that the encoder system uses 1024 pulses and the number of rotor poles is 8, the system may have an error of maximum electric angle of 31.6125 degrees. This causes the generation of torque ripples and the increase of the whole system cost.

In the case of an optical encoder, the control of the switching angle is performed by an output signal of the optical encoder arranged under inductance. FIGS. 3a and 3b illustrate conventional encoder disks and phase sensor signals. The optical encoder has a very simple structure with a low cost, but it is very difficult to perform a high-resolution control of the switching angle through the optical encoder. The switching-on/off angle is calculated at a rising edge and a falling edge of the optical encoder signal, and the accuracy of the calculated switching angle depends upon the microprocessor and the rotor speed. In this case, a PWM (Pulse-Width Modulation) technique is used for the torque adjustment, but the switching of a high frequency causes a switching loss.

Additionally, according to the above-described switching angle control method using the low-priced encoder, it is difficult to perform an accurate phase detection due to its limited resolution, and thus an optimum operation cannot be achieved over the whole operation range. Meanwhile, the SRM control system by the microprocessor has the problems in that its performance is restricted by not only the resolution of the encoder but also the sampling period of the microprocessor. In this case, as the operation speed of the motor becomes higher, the accuracy of the phase switching-on/off angle becomes lower to cause an unstable operation of the motor.

SUMMARY OF THE INVENTION

Accordingly, the present invention has been made to solve the above-mentioned problems occurring in the prior art, and an object of the present invention is to provide a method for controlling an SRM (Switched Reluctance Motor) switching angle by an analog encoder system that can perform a precise control of the switching angle of the SRM with a low cost by determining a switching-on/off angle by the analog encoder system for detecting an analog sensor signal using the analog sensor signal and a switching-on/off command signal.

In order to accomplish the above and other objects, there is provided a method for controlling an SRM (Switched Reluctance Motor) switching angle by an analog encoder system, comprising the steps of during a rotation of an encoder rotor having rotary slits formed at the same intervals on the encoder rotor and continuous contrast (white/black) patterns formed between the respective rotary slits, comparing analog sensor signals $\theta_a$ to $\theta_d$ detected in proportion to the contrast patterns with a switching-on/off command signal controlled by a digital-to-analog (D/A) converter, setting a switching-on angle $\theta_{on}$ to a crossing point of the switching-on command signal $V_{on}$ and a slope between the sensor signals $\theta_a$ and $\theta_o$, and setting a switching-off angle $\theta_{off}$ to a crossing point of the switching-off command signal $V_{off}$ and a slope between the sensor signals $\theta_o$ and $\theta_d$.

Accordingly, a low-priced analog encoder system suitable for a high-performance switching control of an SRM driving system is provided. The analog encoder system is not influenced by the sampling period of the microprocessor and the speed of the SRM driving, and can perform a precise control of the switching-on/off angle at any rotor position.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
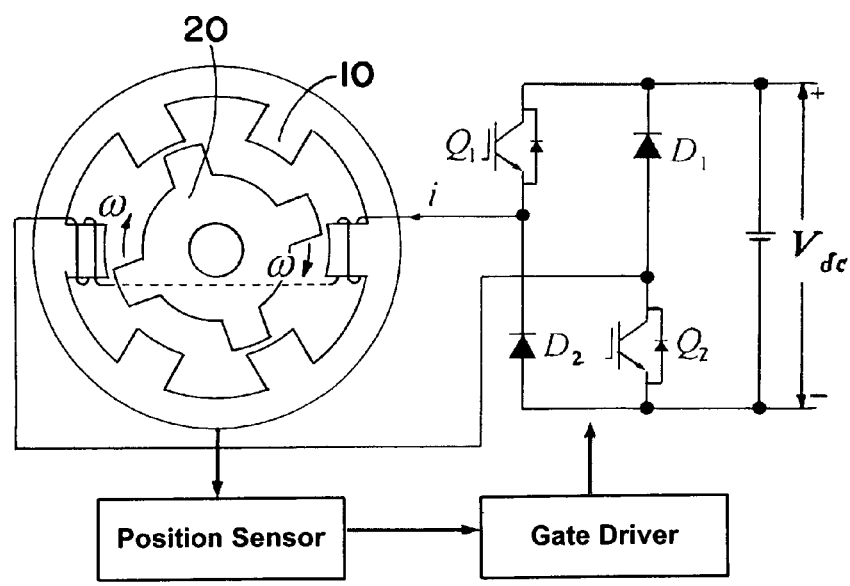
FIG. 1 is a view illustrating a conventional SRM driving system.
Figure 2:
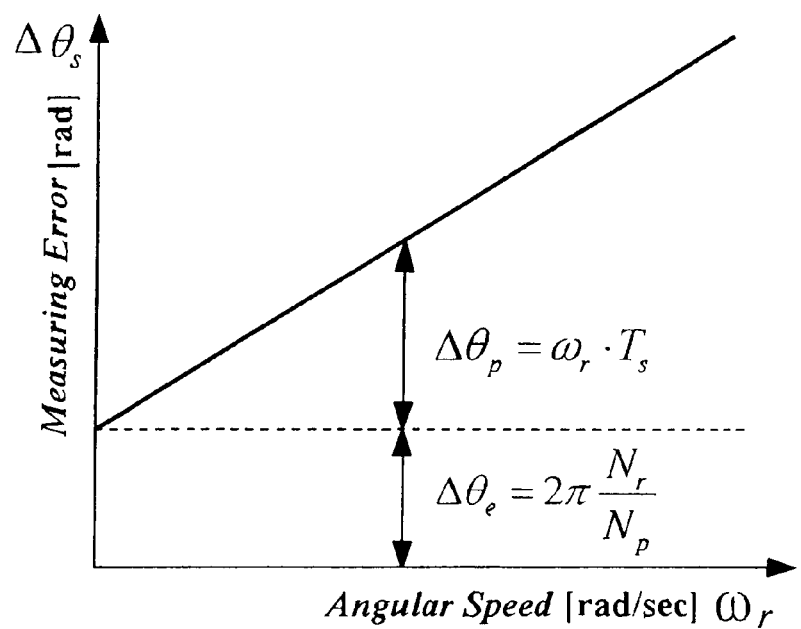
FIG. 2 is a graph illustrating the absolute measurement error according to the speed in the microprocessor of the incremental encoder system.
Figure 3:
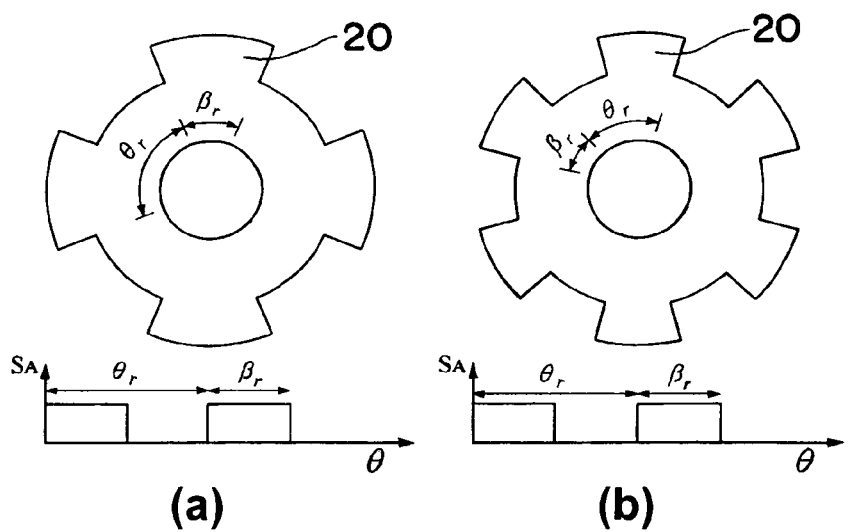
FIG. 3 is a view illustrates phase sensor signals of conventional encoders.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 4:
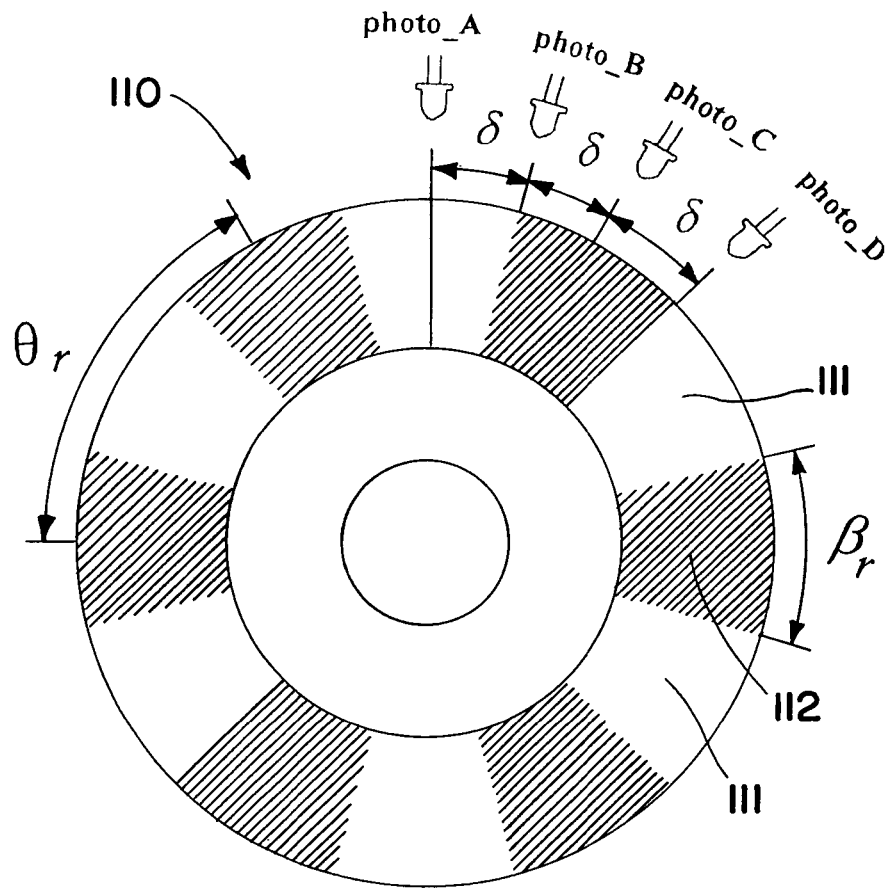
FIG. 4 is a view illustrating a rotor of an analog encoder according to the present invention.

FIG. 4 is a view illustrating a rotor (8/6SRM) of an analog encoder according to the present invention.

Referring to FIG. 4, the rotor 110 of the analog encoder 100 according to the present invention includes a transparent disk, rotary slits 111 formed at the same intervals on the disk, and continuous contrast (white/black) patterns 112 formed between the respective rotary slits 111.

The contrast pattern 112 is formed between two adjacent rotary slits 111, and becomes darker as it becomes more distant from the edge of the rotary slit 111. That is, the contrast pattern 112 becomes darker as it becomes closer to its center part, and thus the center part is the darkest to cause no sensor signal to be produced from the center part.

When the encoder rotor 110 having the continuous contrast pattern 112 formed thereon as described above rotates, an analog sensor signal in proportion to the contrast pattern 111, not the digital sensor signal from the conventional encoder, can be obtained, and this analog sensor signal appears a voltage value of a triangular waveform in proportion to the contrast pattern 112.

Figure 6:
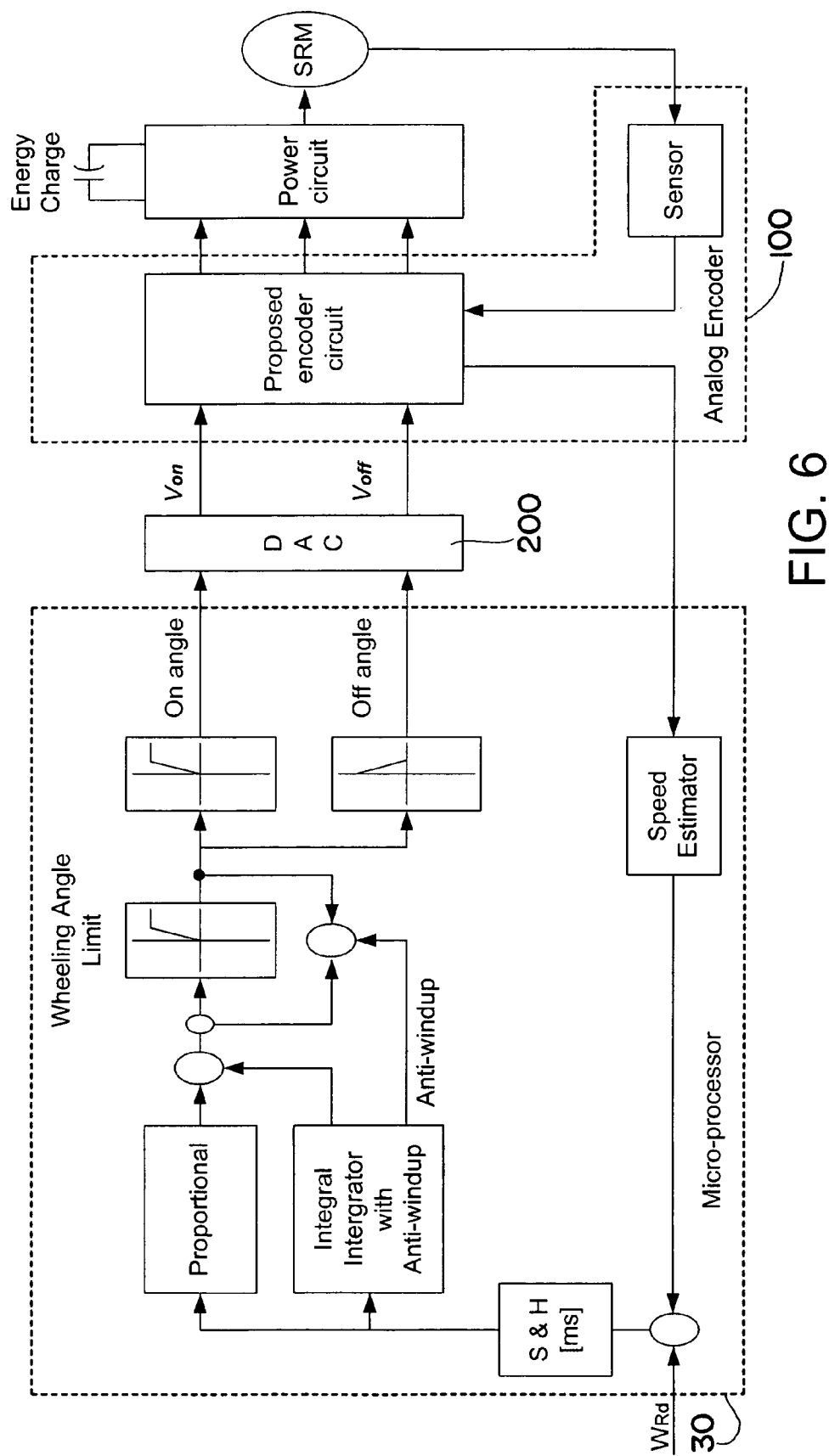
FIG. 6 is a block diagram of a control system according to the present invention.

FIG. 6 is a block diagram of a control system according to the present invention. Referring to FIG. 6, the control system includes a microprocessor 30 that is a simple PIC (Peripheral Interface Controller) processor, a two-channel 10-bit digital-to-analog (D/A) converter 200 for the switching angle control, and an analog encoder 100 for receiving a switching-on/off command signal from the D/A converter 200.

Figure 5:
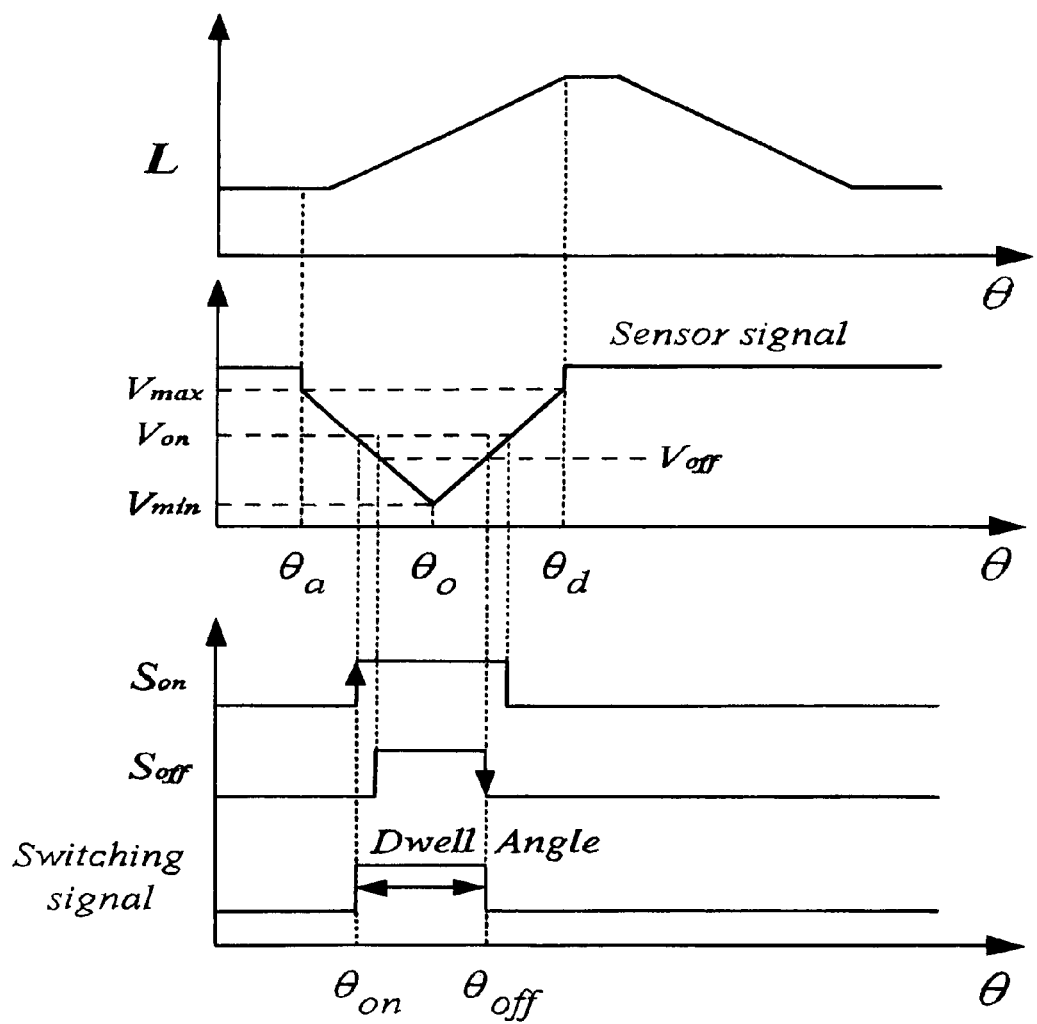
FIG. 5 is a graph explaining the SRM angle control principle of an analog encoder system according to the present invention.

FIG. 5 is a graph explaining the SRM angle control principle of the analog encoder 100 according to the present invention. The switching angle control is performed using the analog sensor signal by the analog encoder 100 and the switching-on/off command signal controlled by the D/A converter 200.

In FIG. 5, the upper waveform shows the output signal of the proposed encoder according to an inductance profile. The intermediate waveforms show the analog sensor signals $\theta_a$ to $\theta_d$ from the analog encoder 100 and the switching-on/off command signals $V_{on}$ and $V_{off}$ controlled by the D/A converter 200. The lower waveforms show switching-on/off angles $\theta_{on}$ and $\theta_{off}$ set at the crossing points of the analog sensor signals and the switching-on/off command signals by comparing the analog sensor signals and the switching-on/off command signals. That is, the switching-on angle $\theta_{on}$ is positioned on a downward slope between the analog sensor signals $\theta_a$ and $\theta_o$, and the switching-off angle $\theta_{off}$ is positioned on a upward slope between the analog sensor signals $\theta_o$ and $\theta_d$.

Meanwhile, by giving a step change at the end part of the contrast pattern 112 of the encoder rotor 110, an excitation angle can simply be limited. Accordingly, the end part of the pattern of the encoder sensor signal corresponds to a signal in the form of a step, so that the excitation is limited in the maximum dwell angle $\beta_r$.

Figure 7:
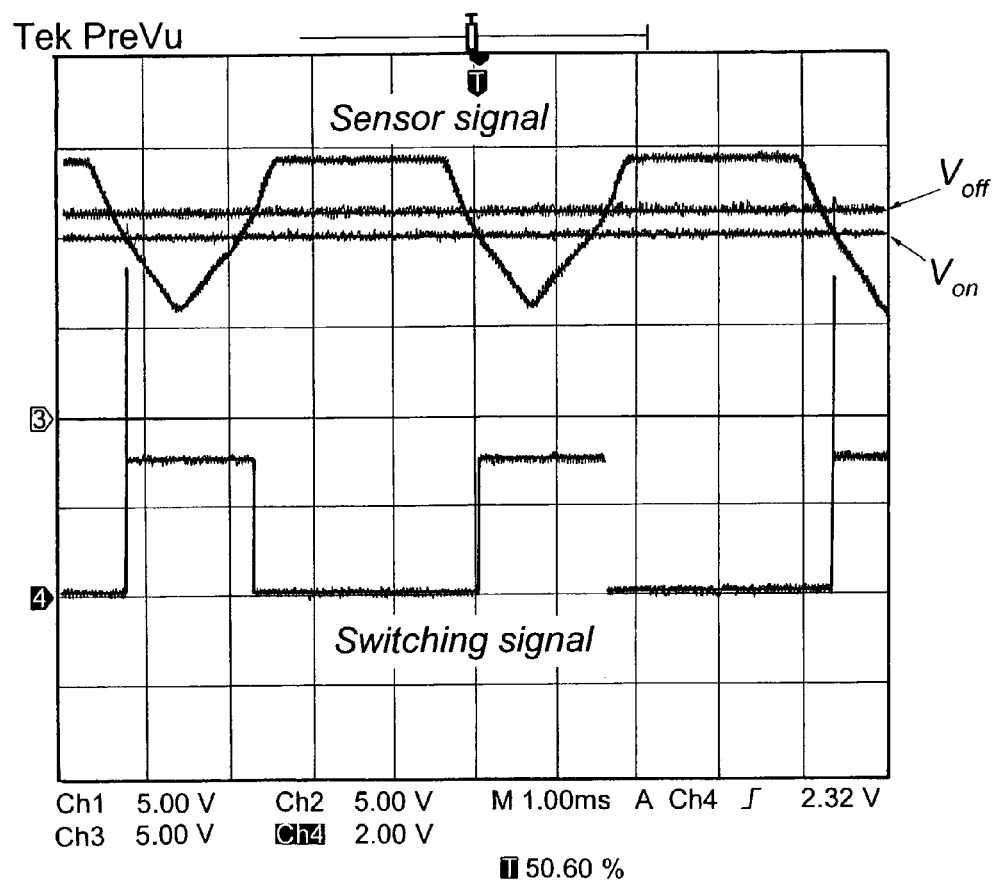
FIG. 7 is a graph illustrating an output waveform of an analog encoder having an SRM mounted thereon according to the present invention.

FIG. 7 is a graph illustrating an output waveform of an analog encoder having an SRM mounted thereon according to the present invention. The encoder has 12 stator salient poles, 8 rotor salient poles and three photosensors for producing the analog sensor signals. As illustrated in FIG. 7, the switching-on/off signals are determined at the crossing points of the analog sensor signals and the two switching-on/off command signals by comparing the analog sensor signals with the switching-on/off command signals.

Figure 8:
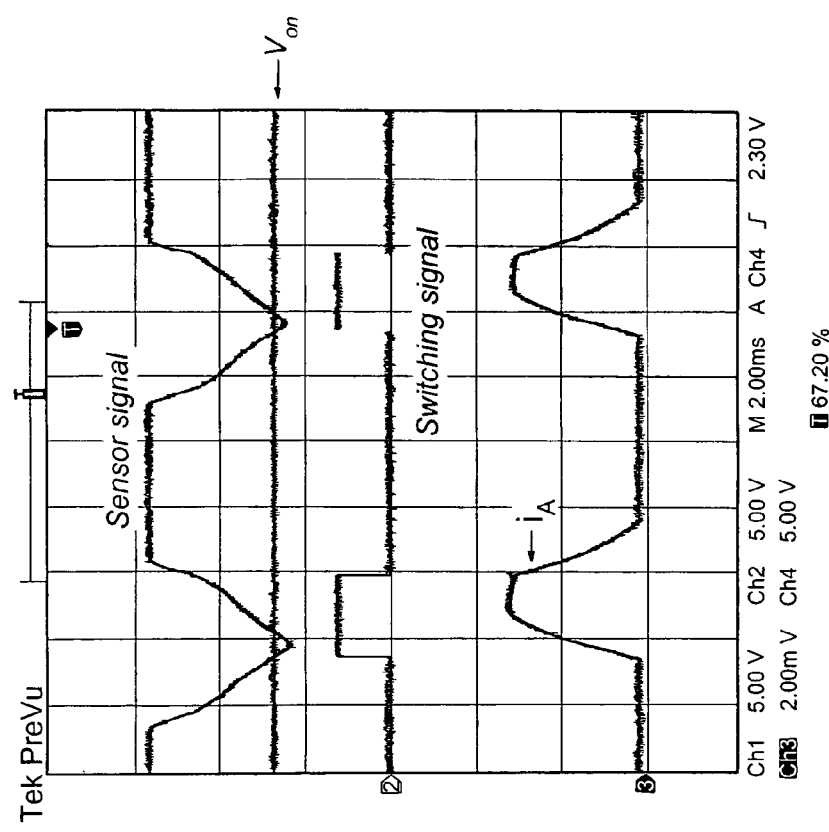
FIGS. 8a and 8b are graphs illustrating waveforms of a sensor signal, a switching-on signal, a switching-off signal and a current appearing in a control system according to the present invention.
Figure 8:
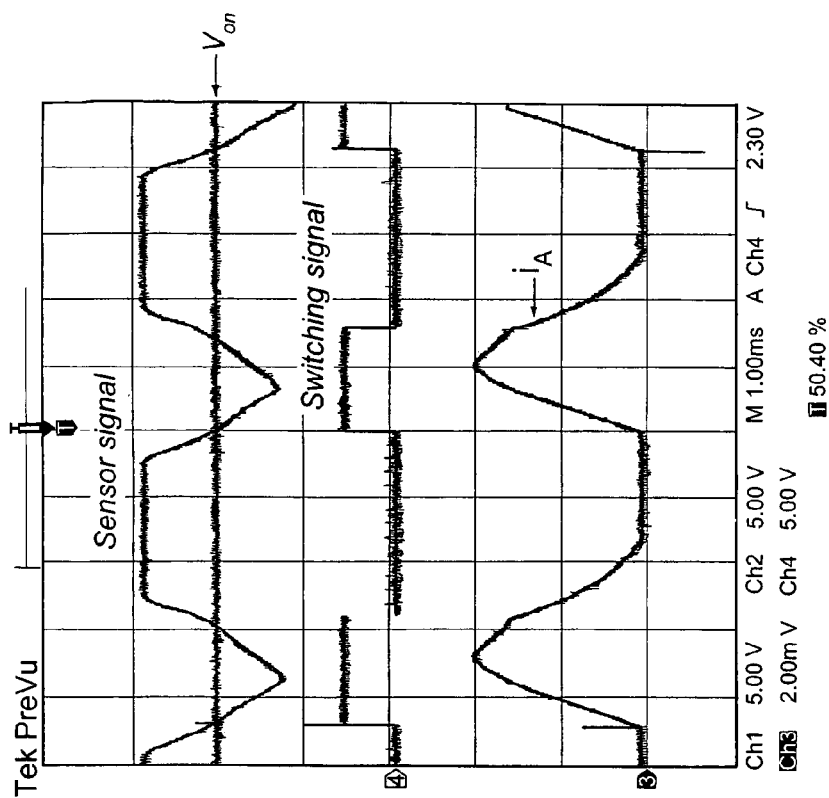

FIGS. 8a and 8b are graphs illustrating waveforms of a sensor signal, a switching-on signal, a switching-off signal and a current appearing in a control system according to the present invention. The waveform of a phase current is determined by the analog sensor signals and the switching command signals. FIG. 8a illustrates the respective signal waveforms when the motor speed is 1750 [rpm], and FIG. 8b the respective signal waveforms when the motor speed is 800 [rpm]. It can be seen from FIGS. 8a and 8b that a precise switching-on/off control is performed at the positions desired by a user irrespective of the motor speed.

Figure 9:
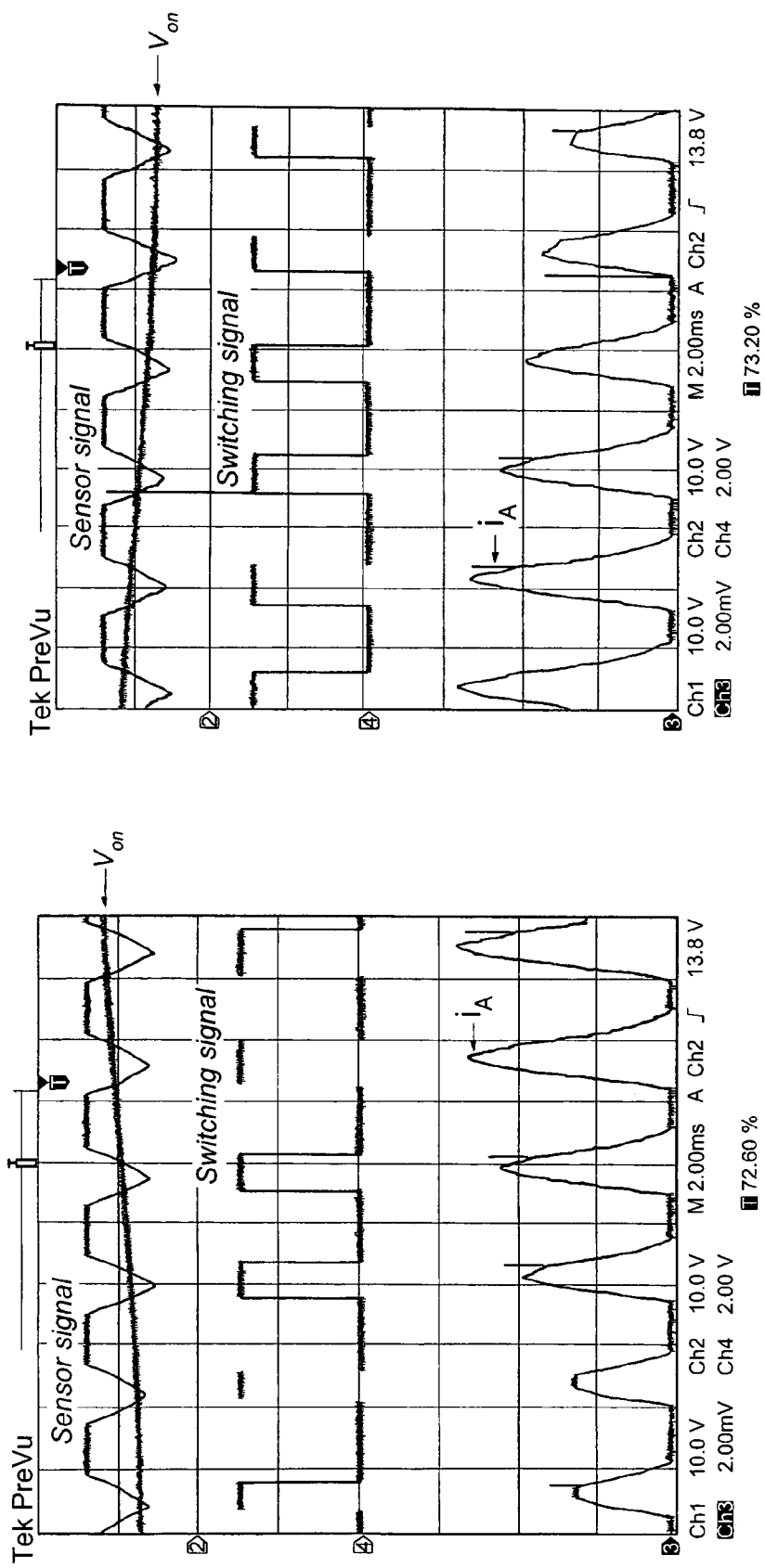
FIGS. 9a and 9b are graphs explaining the switching angle adjustment and phase current according to an abrupt load change in an encoder and control system according to the present invention.

FIGS. 9a and 9b are graphs explaining the switching angle adjustment and phase current according to an abrupt load change in an encoder and control system according to the present invention. FIG. 9a illustrates the phase current when the load is changed from 1.3 [Nm] to 2.5 [Nm] at the motor speed of 2000 [rpm], and FIG. 9b illustrates the phase current when the load is changed from 2.5 [Nm] to 1.3 [Nm] at the motor speed of 2000 [rpm]. The switching angle is adjusted according to the change of the switching-on command signal. Accordingly, the switching angle is properly controlled irrespective of the abrupt load change, and a smooth torque is generated when the motor speed is reduced.

As described above, according to the present invention, using a low-priced and simple-structured analog encoder having continuous contrast patterns formed thereon, analog sensor signals in proportion to the contrast patterns are detected, and the switching-on/off angle control is performed at any position desired by the user using the analog sensor signals and switching-on/off command signals.

According to the present invention, the low-priced analog encoder system suitable for a high-performance switching control of an SRM driving system is provided. The analog encoder system is not influenced by the sampling period of the microprocessor and the speed of the SRM driving, and can perform the precise control of the switching-on/off angle at any rotor position.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for controlling an SRM (Switched Reluctance Motor) switching angle by an analog encoder system, comprising the steps of:

during a rotation of an encoder rotor having rotary slits formed at the same intervals on the encoder rotor and continuous contrast patterns formed between the respective rotary slits, comparing analog sensor signals $\theta_a$ to $\theta_d$ detected in proportion to the contrast patterns with a switching-on/off command signal controlled by a digital-to-analog (D/A) converter;

setting a switching-on angle $\theta_{on}$ to a crossing point of the switching-on command signal $V_{on}$ and a slope between the sensor signals $\theta_a$ and $\theta_o$; and setting a switching-off angle $\theta_{off}$ to a crossing point of the switching-off command signal $V_{off}$ and a slope between the sensor signals $\theta_o$ and $\theta_d$.

* * * * *